United States Patent
Fujita et al.

(10) Patent No.: US 10,073,220 B2
(45) Date of Patent: Sep. 11, 2018

(54) OPTICAL COUPLER, LASER DEVICE, AND TAPER FIBER

(71) Applicant: FUJIKURA LTD., Tokyo (JP)

(72) Inventors: Tomoyuki Fujita, Sakura (JP); Kentaro Ichii, Sakura (JP); Ken Katagiri, Sakura (JP); Kenichi Ohmori, Sakura (JP); Rintaro Kitahara, Sakura (JP); Tatsuya Kishi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/451,010

(22) Filed: Mar. 6, 2017

(65) Prior Publication Data
US 2017/0235055 A1   Aug. 17, 2017

Related U.S. Application Data

(63) Continuation of application No. PCT/JP2015/074884, filed on Sep. 1, 2015.

(30) Foreign Application Priority Data

Oct. 17, 2014   (JP) .................. 2014-213129

(51) Int. Cl.
*G02B 6/26*   (2006.01)
*G02B 6/28*   (2006.01)
(Continued)

(52) U.S. Cl.
CPC ............ *G02B 6/26* (2013.01); *G02B 6/03611* (2013.01); *G02B 6/2552* (2013.01); *G02B 6/262* (2013.01);
(Continued)

(58) Field of Classification Search
CPC ............................. G02B 6/2835; G02B 6/2856
See application file for complete search history.

(56) References Cited

U.S. PATENT DOCUMENTS

| 7,492,993 B2* | 2/2009 | Nakai | G02B 6/2835 |
| | | | 385/15 |
| 8,818,151 B1* | 8/2014 | Ward | G02B 6/264 |
| | | | 264/1.28 |

(Continued)

FOREIGN PATENT DOCUMENTS

| JP | 55-147010 U | 10/1980 |
| JP | 61-107 U | 1/1986 |

(Continued)

OTHER PUBLICATIONS

Yoshikiyo et al. (Machine Translation of JP 2013-190714 A, Sep. 2013).*

(Continued)

*Primary Examiner* — Michelle R Connelly
(74) *Attorney, Agent, or Firm* — Westerman, Hattori, Daniels & Adrian, LLP

(57) ABSTRACT

Provided is an optical coupler configured to cause an NA of light, which exits a taper fiber, to be smaller as compared with a conventional optical coupler. A taper fiber has a high refractive index part which is provided inside a core of the taper fiber and which has a refractive index smaller than a refractive index $n_{core}$ of the core. An exit end surface of each GI fiber is bonded to an entrance end surface of the taper fiber so that at least a part of the exit end surface of the each GI fiber overlaps with a section of the high refractive index part. A relative refractive index difference of the taper fiber is smaller than 0.076%.

16 Claims, 7 Drawing Sheets

(51) Int. Cl.
*G02B 27/09* (2006.01)
*G02B 6/255* (2006.01)
*G02B 6/036* (2006.01)

(52) U.S. Cl.
CPC ....... *G02B 6/2804* (2013.01); *G02B 27/0994* (2013.01)

(56) References Cited

U.S. PATENT DOCUMENTS

| | | | | |
|---|---|---|---|---|
| 9,069,118 | B2* | 6/2015 | Matsuo | G02B 6/02042 |
| 2009/0110008 | A1* | 4/2009 | Dong | G02B 6/2551 |
| | | | | 372/6 |
| 2009/0154882 | A1 | 6/2009 | Salokatve | |
| 2009/0251770 | A1 | 10/2009 | Lewis | |
| 2011/0274398 | A1* | 11/2011 | Fini | G02B 6/02042 |
| | | | | 385/124 |
| 2011/0279888 | A1* | 11/2011 | Fini | G02B 6/2835 |
| | | | | 359/334 |
| 2013/0273240 | A1* | 10/2013 | Holland | G02B 6/262 |
| | | | | 427/163.2 |
| 2014/0178021 | A1* | 6/2014 | Kashiwagi | H01S 3/06791 |
| | | | | 385/124 |
| 2014/0205236 | A1* | 7/2014 | Noguchi | G02B 6/2835 |
| | | | | 385/33 |
| 2014/0294345 | A1* | 10/2014 | Kopp | G02B 6/30 |
| | | | | 385/24 |
| 2015/0234120 | A1* | 8/2015 | Uemura | G02B 6/028 |
| | | | | 385/124 |
| 2015/0247980 | A1* | 9/2015 | Bradley | G02B 6/3851 |
| | | | | 29/868 |
| 2016/0020573 | A1* | 1/2016 | Watanabe | G02B 6/2856 |
| | | | | 359/341.3 |
| 2016/0154182 | A1* | 6/2016 | Noguchi | G02B 6/2808 |
| | | | | 385/96 |
| 2016/0161674 | A1* | 6/2016 | Tanaka | G02B 6/262 |
| | | | | 385/24 |
| 2016/0245992 | A1* | 8/2016 | Takenaga | G02B 6/02019 |
| 2017/0146371 | A1* | 5/2017 | Kozlov | G01D 5/268 |

FOREIGN PATENT DOCUMENTS

| | | | | |
|---|---|---|---|---|
| JP | 2013-065704 | A | 4/2013 | |
| JP | 2013-142792 | A | 7/2013 | |
| JP | 2013-190714 | A | 9/2013 | |
| JP | 2013190714 | A * | 9/2013 | ........... G02B 6/2835 |
| JP | 2014-123648 | A | 7/2014 | |
| WO | 2013/090549 | A2 | 6/2013 | |

OTHER PUBLICATIONS

"Jitsumu ni yakudatsu hikari fiber gijutsu 200 points (200 Practically-Useful Tips for Optical Fiber Techniques)", The Telecommunications Association (TTA), Japan, Ohmsha, Ltd., Jul. 10, 1998, the 3rd revised version, pp. 29 and 30, cited in Japanese Notification of Reasons for Refusal dated Dec. 8, 2015 and Decision to Grant a Patent dated Feb. 23, 2016 (3 pages).
International Search Report dated Oct. 6, 2015, issued in counterpart International Application No. PCT/JP2015/074884 (1 page).
Notification of Reasons for Refusal dated Sep. 15, 2015, issued in counterpart Japanese Patent Application No. 2014-213129, w/English translation (10 pages).
Notification of Reasons for Refusal dated Dec. 8, 2015, issued in counterpart Japanese Patent Application No. 2014-213129, w/English translation (6 pages).
Decision to Grant a Patent dated Feb. 23, 2016, issued in counterpart Japanese Patent Application No. 2014-213129, w/English translation (5 pages).
Notification of Reasons for Refusal dated Jan. 10, 2017, issued in counterpart Japanese Patent Application No. 2016-059171, w/English translation (10 pages).
Extended European Search Report dated Jul. 28, 2017, issued in counterpart European Application No. 15850299.7. (10 pages).
Office Action dated Aug. 22, 2017, issued in Japanese Application No. 2016-059171, with English translation (4 pages).

\* cited by examiner

OPTICAL COUPLER, LASER DEVICE, AND TAPER FIBER

CROSS-REFERENCE TO RELATED APPLICATIONS

This application is a Continuation of PCT International Application No. PCT/JP2015/074884 filed in Japan on Sep. 1, 2015, 2015, which claims the benefit of Patent Application No. 2014-213129 filed in Japan on Oct. 17, 2014, the entire contents of which are hereby incorporated by reference.

TECHNICAL FIELD

The present invention relates to (i) an optical coupler which couples light emitted from a plurality of light sources, a laser device which includes the optical coupler, and (iii) a taper fiber which is included in the optical coupler.

BACKGROUND ART

An optical coupler, which couples light emitted from a plurality of light sources, is often employed in a laser device such as a fiber laser. Such an optical coupler includes (i) a plurality of input optical fibers, (ii) a taper fiber having an entrance end surface to which exit end surfaces of the respective plurality of input optical fibers are bonded, and (iii) an output optical fiber having an entrance end surface to which an exit end surface of the taper fiber is bonded. The taper fiber is an optical fiber (i) which has a reduced diameter part in which a core diameter of the taper fiber gradually decreases as a distance is farther from the entrance end surface and (ii) in which the core diameter in the exit end surface is smaller than in the entrance end surface.

In such an optical coupler, it is of importance to reduce an NA (numerical aperture) of light which has entered the taper fiber. This is because the light, which has entered the taper fiber, increases in NA while propagating in the reduced diameter part due to reflection of the light at a boundary between a core and a cladding.

As such, even in a case where an input fiber has an NA substantially equal to that of the output optical fiber, an NA of light which exits the taper fiber, i.e., an NA of light which enters the output optical fiber, can exceed the NA of the output optical fiber. This causes light to be leaked in the vicinity of the entrance end surface of the output optical fiber, and ultimately causes a deterioration in and/or burnout of a jacket of the output optical fiber.

An optical coupler (referred to, in Patent Literature 1, as an "optical fiber combiner") disclosed in Patent Literature 1 is known as a technique to address such a problem. According to Patent Literature 1, the optical coupler makes good in a reduction in NA of light which has entered a taper fiber (referred to, in Patent Literature 1, as a "bridge fiber"), by providing a graded index (GI) fiber referred to, in Patent Literature 1, as "GRIN lenses") between respective input optical fibers and the taper fiber.

Note that, in the present specification, an NA of light which propagates in an optical fiber (which includes a taper fiber) refers to a physical value defined by $n \times \sin \theta$, where $\theta$ is an angle between a propagation direction of the light and a central axis of the optical fiber and n is a refractive index of a core of the optical fiber. If an NA of light which has propagated in the taper fiber does not exceed that of an output optical fiber before the light exits the taper fiber, then the light will be confined in the output optical fiber. In contrast, if an NA of light which has propagated in the taper fiber exceeds that of the output optical fiber before the light exits the taper fiber, then the light will leak out of the output optical fiber.

CITATION LIST

Patent Literature

[Patent Literature 1]
Japanese Patent Application Publication Tokukai No. 2013-190714 (Publication Date: Sep. 26, 2013)

SUMMARY OF INVENTION

Technical Problem

However, even in a case where the optical coupler disclosed in Patent Literature 1 is employed, it is still unavoidable for an NA of light, which has entered a taper fiber, to increase while the light is propagating in a reduced diameter part. Thus, in a case where an optical fiber having a small NA is employed as an output optical fiber, an NA of light which exits a taper fiber can exceed that of the output optical fiber.

In order to increase the number of input optical fibers, it is essential to increase a diameter, in an entrance end surface, of a taper fiber. However, if the diameter, in the entrance end surface, of the taper fiber is increased without changing a length of a reduced diameter part of the taper fiber, then an amount of reduced diameter per unit length in the reduced diameter part is increased. This causes an increase in NA of light which exits the taper fiber, and ultimately causes the NA of the light, which exits the taper fiber, to exceed that of an output optical fiber. Such a problem will also occur in a case where a length of a reduced diameter part of a taper fiber is reduced without changing a diameter, in an entrance end surface, of the taper fiber.

The present invention has been attained in view of the above problem, and an object of the present invention is to provide an optical coupler in which an NA of light, which exits a taper fiber, is reduced as compared with a conventional optical coupler (more specifically, an optical coupler in which a proportion of light, whose NA exceeds that of an output optical fiber, with respect to light which exits a taper fiber is reduced as compared with conventional optical coupler).

Solution to Problem

An optical coupler in accordance with an embodiment of the present invention includes: a plurality of optical fibers; and a taper fiber having an entrance end surface to which an end surface of each of, the plurality of optical fibers is bonded, the taper fiber having a core diameter which is smaller in an exit end surface than in the entrance end surface, the taper fiber having a high refractive index part provided inside a core of the taper fiber, the high refractive index part having a refractive index greater than a refractive index $n_{core}$ of the core, the end surface of the each of the plurality of optical fibers being bonded to the entrance end surface of the taper fiber so that at least a part of the end surface of the each of the plurality of optical fibers overlaps with a cross section of the high refractive index part of the taper fiber, the taper fiber having a relative refractive index difference $\Delta$ which is smaller than 0.076%, the relative refractive index difference Δ being defined by $(n_{peak}-n_{core})/n_{peak}$, where $n_{peak}$ is a maximum refractive index of the high refractive index part.

The above configuration allows at least a part of light which has exited each of the plurality of optical fibers to enter the high refractive index part of the taper fiber. Note that light which has entered the high refractive index part tends to remain in the high refractive index part. As such, the high refractive index part can prevent light, which propagates in the reduced diameter part of the taper fiber, from being spread out. That is, the high refractive index part prevents an NA of light, which has entered the high refractive index part, from increasing. Consequently, an NA of at least a part of light which exits the taper fiber is reduced as compared with a case where no high refractive index part exists. This causes a proportion of light, whose NA exceeds that of the output optical fiber, with respect to light, which exits the taper fiber, to be reduced as compared with a case where a conventional optical coupler is employed. Furthermore, the above configuration makes it possible to surely cause an NA of light, which exits the taper fiber, to be reduced as compared with a case where no high refractive index part exists.

An optical coupler in accordance with an embodiment of the present invention includes: a plurality of optical fibers; and a taper fiber having an entrance end surface to which an end surface of each of the plurality of optical fibers is bonded, the taper fiber having a core diameter which is smaller in an exit end surface than in the entrance end surface, the taper fiber having a high refractive index part provided inside a core of the taper fiber, the high refractive index part having a refractive index greater than a refractive index $n_{core}$ of the core, the end surface of the each of the plurality of optical fibers being bonded to the entrance end surface of the taper fiber so that at least a part of the end surface of the each of the plurality of optical fibers overlaps with a cross section of the high refractive index part of the taper fiber, a relative refractive index difference Δ of the taper fiber satisfying NA(Δ)<NA(0), where Δ is defined by $(n_{peak}-n_{core})/n_{peak}$ where $n_{peak}$ is a maximum refractive index of the high refractive index part; NA(Δ) is an NA of light which exits the taper fiber, the NA depending on the e refractive index difference Δ and being defined by n×sin θ where n is a refraction index of a medium which the light enters and θ is an angle between a propagation direction of the light and a central axis of the taper fiber.

Note that (i) a laser device which includes the above optical coupler and (ii) a taper fiber which is included in the above optical coupler are also encompassed in the scope of the present invention.

Advantageous Effects of Invention

The present invention makes it possible to provide an optical coupler in which an NA of light which exits a taper fiber is reduced as compared with a conventional optical coupler.

Figure 1:
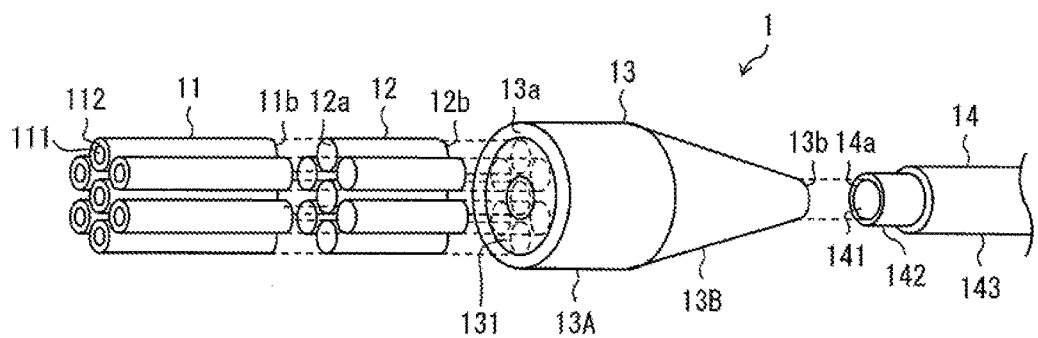
FIG. 1 is an exploded perspective view illustrating a configuration of an optical coupler in accordance with an embodiment of the present invention.
Figure 2:
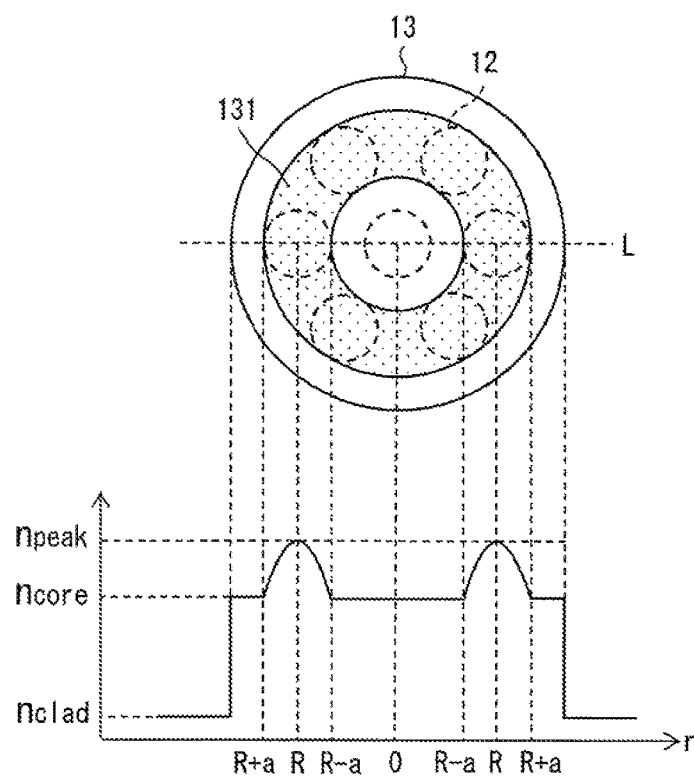

An upper part of FIG. 2 is a sectional view illustrating a cross section of a taper fiber included in the optical coupler illustrated in FIG. 1. A lower part of FIG. 2 is a graph indicating a refractive index distribution of the taper fiber.

Figure 3:
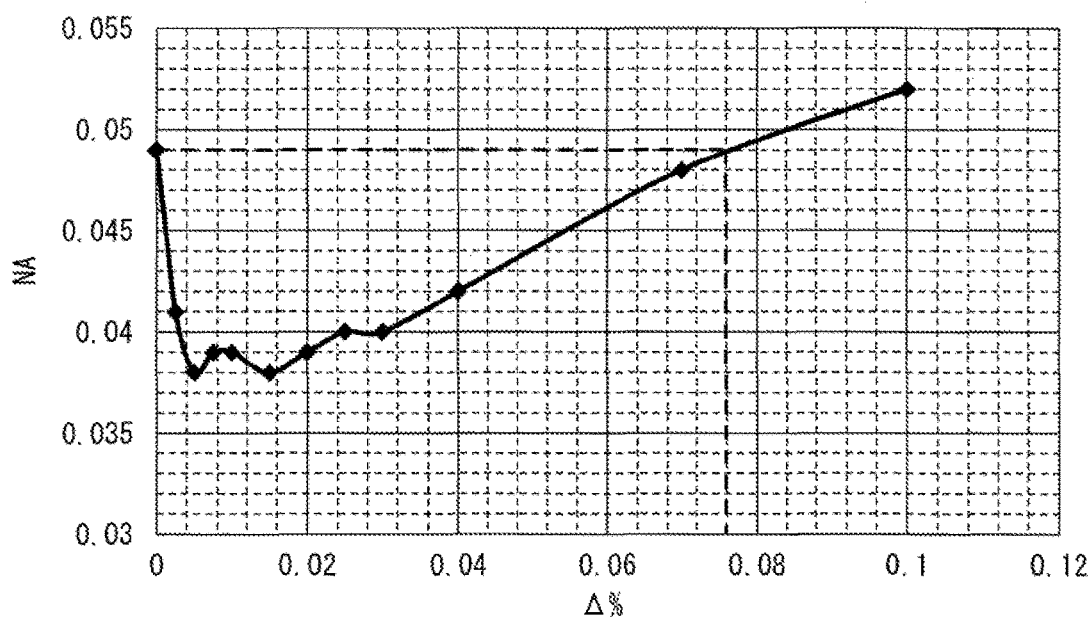

FIG. 3 is a graph indicating how an NA of light, which exits the taper fiber included in the optical coupler illustrated in FIG. 1, varies in accordance with a relative refractive index difference.

Figure 4:
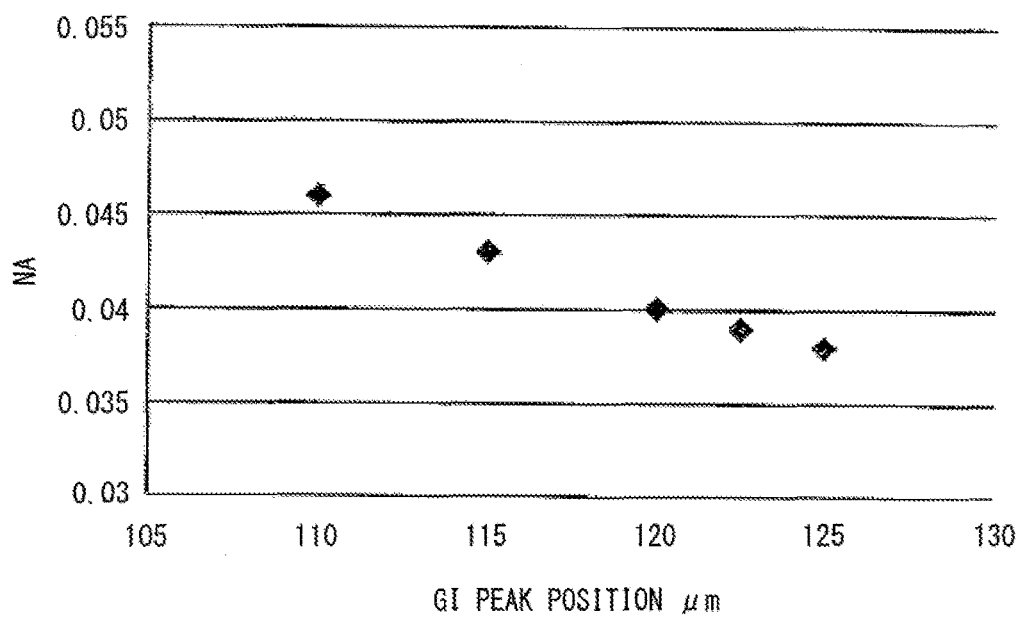

FIG. 4 is a graph indicating how an NA of light, which exits the taper fiber included in the optical coupler illustrated in FIG. 1, varies in accordance with a GI peak point.

Figure 5:
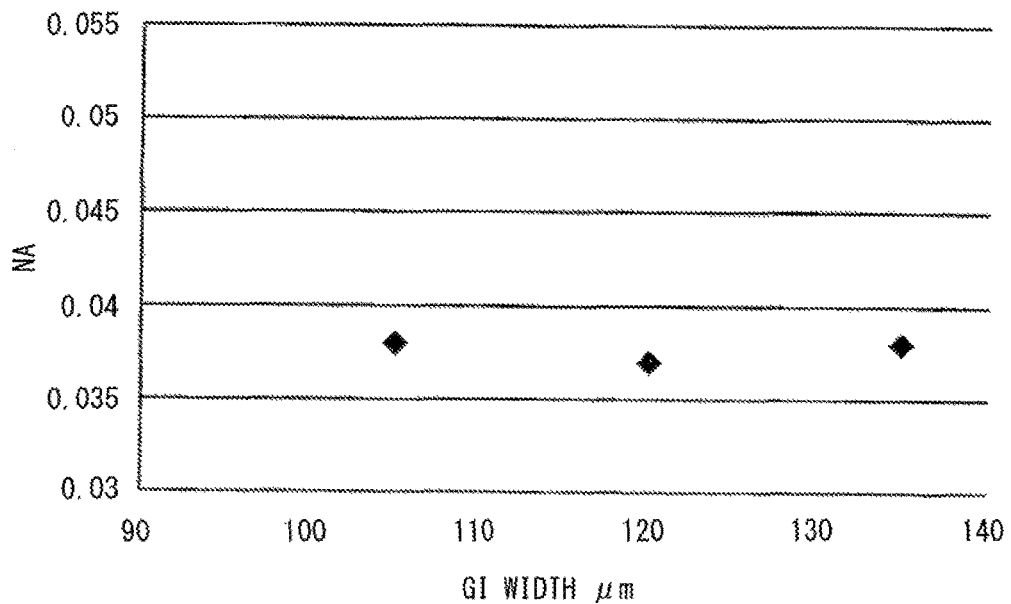

FIG. 5 is a graph indicating how an NA of light, which exits the taper fiber included in the optical coupler illustrated in FIG. 1, varies in accordance with a GI width.

Figure 6:
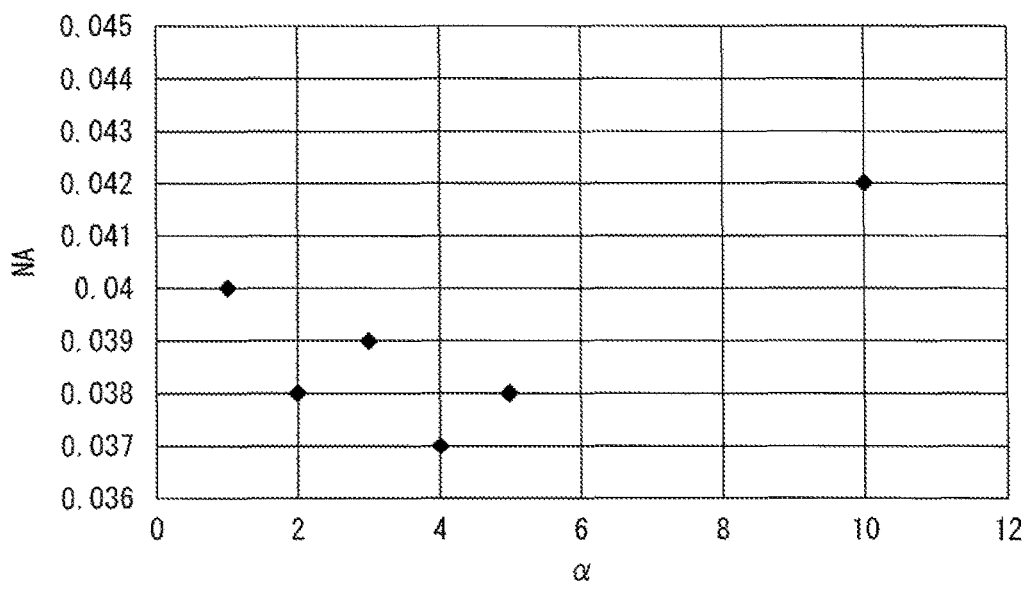

FIG. 6 is a graph indicating how an NA of light, which exits the taper fiber included in the optical coupler illustrated in FIG. 1, varies in accordance with an index α.

Figure 7A:
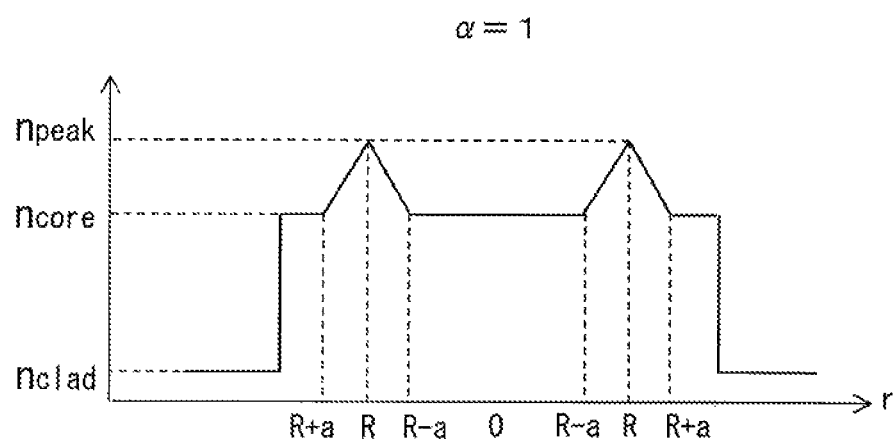
Figure 7B:
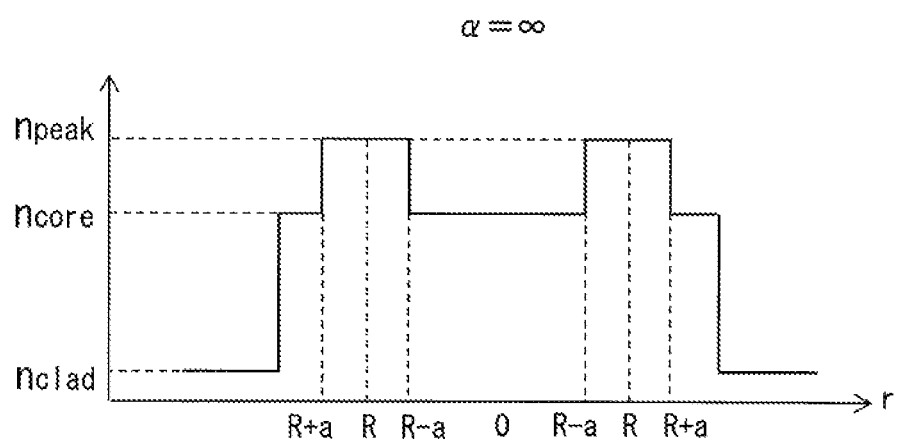

FIG. 7A and FIG. 7B are a graph indicating refractive index distribution of the taper fiber included in the optical coupler illustrated in FIG. 1. FIG. 7A is a graph obtained in a case of α=1. FIG. 7B is a graph obtained in a case of α=∞.

Figure 8:
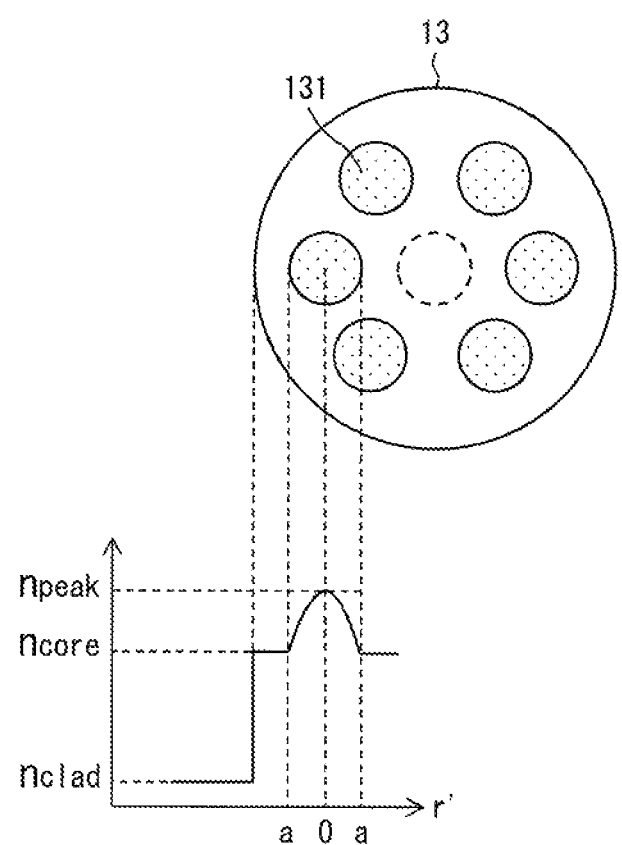

An upper part of FIG. 8 is a sectional view illustrating a cross section of a taper fiber included in an optical coupler in accordance with Variation 1. A lower part of FIG. 8 is a graph indicating a refractive index distribution of the taper fiber.

Figure 9:
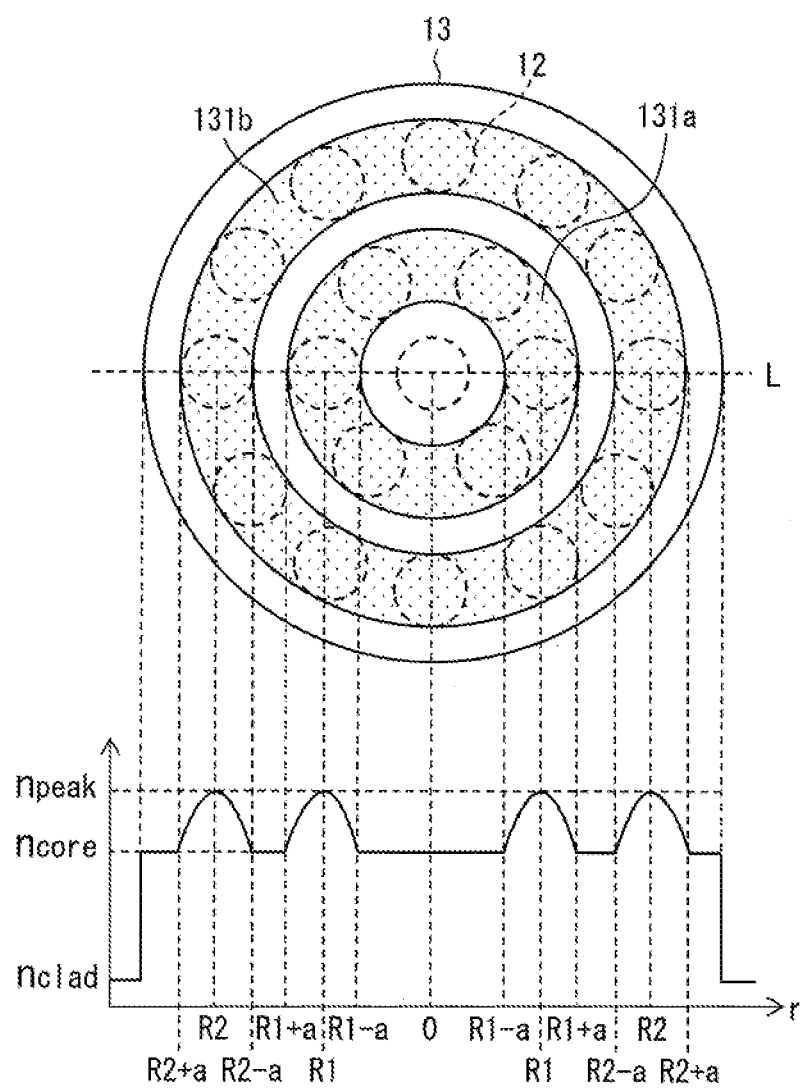

An upper part of FIG. 9 is a sectional view illustrating a cross section of a taper fiber included in an optical coupler in accordance with Variation 2. A lower part of FIG. 9 is a graph indicating a refractive index distribution of the taper fiber.

Figure 10:
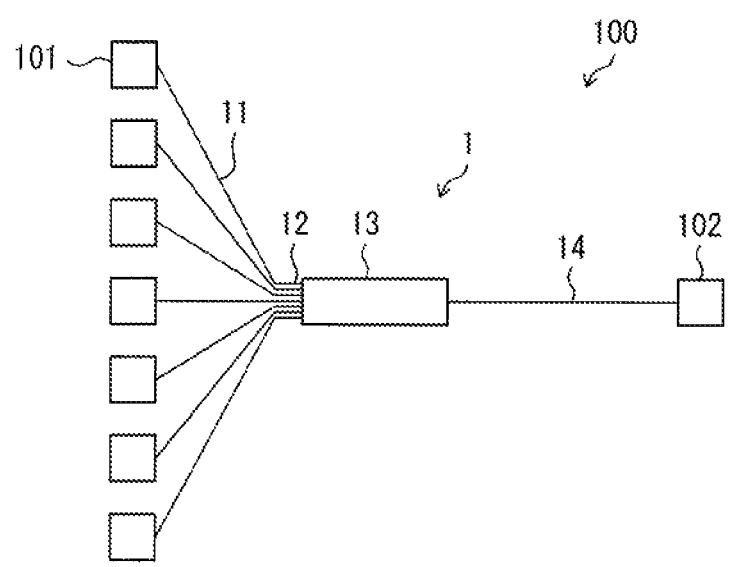

FIG. 10 is a block diagram illustrating a configuration of a laser device which includes the optical coupler illustrated in FIG. 1.

DESCRIPTION OF EMBODIMENT

[Configuration of Optical Coupler]

The following description will discuss, with reference to FIG. 1, a configuration of an optical coupler 1 in accordance with an embodiment of the present invention. FIG. 1 is an exploded perspective view illustrating the configuration of the optical coupler 1.

The optical coupler 1 is a device configured to couple light emitted from a plurality of light sources. As illustrated in FIG. 1, the optical coupler 1 includes (i) a plurality of input optical fibers 11, (ii) a plurality of graded index (GI) fibers 12, (iii) a taper fiber 13, and (iv) an output optical fiber 14.

Each input optical fiber 11 is configured to cause light, emitted from a corresponding one of the plurality of light sources, to propagate. Each input optical fiber 11 includes (i) a core 111 having a columnar shape and (ii) a cladding 112, having a cylindrical shape, which clads a side surface of the core 111 and has a refractive index smaller than that of the core 111. Each input optical fiber 11 can further include a jacket (not illustrated) on the cladding 112. A core diameter, a cladding diameter, and a length of each input optical fiber 11 are not respective specific dimensions. An entrance end surface 12a of each GI fiber 12 is bonded (by, for example, fusion splicing) to an exit end surface 11b of a corresponding one of the input optical fibers 11. Light, which has exited each input optical fiber 11 via the exit end surface 11b, enters a corresponding one of the GI fibers 12 via its entrance end surface 12a.

Each GI fiber 12 is configured to reduce an NA of light which has exited a corresponding one of the input optical fibers 11. Each GI fiber 12 is an optical fiber having an axially-symmetric refractive index distribution which gradually decreases as a distance is farther from a central axis of the GI fiber 12. An optical fiber, having such a refractive index distribution, is sometimes referred to as a graded index (GRIN) lens. A diameter of each GI fiber 12 simply needs to be equal to or greater than a core diameter of a corresponding one of the input optical fibers 11. In the present embodiment, the diameter of each GI fiber 12 is equal to a cladding diameter of a corresponding one of the input optical fibers 11. Each GI fiber 12 has a length not equal to n-times (n is a natural number) a 0.5 pitch length of light which exits a corresponding one of the input optical fibers 11. This allows an NA of light, which exits the GI fiber 12, to be smaller than that of light which has entered the GI fiber 12. Particularly in a case where each GI fiber 12 has a length equal to odd-times a 0.25 pitch length of light which exits a corresponding one of the input optical fibers 11, it is possible to collimate light which exits the GI fiber 12. An entrance end surface 13a of the taper fiber 13 is bonded (by, for example, fusion splicing) to an exit end surface 12b of each GI fiber 12. This causes light, which has exited each GI fiber 12 via its exit end surface 12b, to enter the taper fiber 13 via the entrance end surface 13a.

The taper fiber 13 is configured to couple light which has exited the plurality of GI fibers 12. The taper fiber 13 is an optical fiber having a core diameter which is smaller in an exit end surface 13b than in the entrance end surface 13a. The present embodiment employs an air-clad optical fiber as the taper fiber 13. In other words, (i) the entire taper fiber 13 serves as a core and (ii) environmental air of the taper fiber 13 serves as a cladding. Furthermore, in the present embodiment, the taper fiber 13 has a round shank pencil shape which is obtained by combining a circular cylinder part and a truncated cone part. Hereinafter, the circular cylinder part will be referred to as a "non-reduced diameter part 13A," and the truncated cone part will be referred to as a "reduced diameter part 13B." A diameter (a core diameter), in the entrance end surface 13a, of the taper fiber 13 merely needs to be equal to or greater than that of a minimum circle which entirely contain cross sections (i.e., cross sections orthogonal to the central axis) of the respective plurality of GI fibers 12. The diameter, in the exit end surface 13b, of the taper fiber 13 merely needs to be equal to or smaller than a core diameter of the output optical fiber 14 (later described). A length of the taper fiber 13 is not limited to a specific one. An entrance end surface 14a of the output optical fiber 14 is bonded (by, for example, fusion splicing) to the exit end surface 13b of the taper fiber 13. Light which has exited the taper fiber 13 via the exit end surface 13b enters the output optical fiber 14 via the entrance end surface 14a.

In the core of the taper fiber 13 (in the taper fiber 13 itself in a case where an air cladding is employed as with the present embodiment), a high refractive index part 131 which (i) extends from the entrance end surface 13a toward the exit end surface 13b and (ii) secures a refractive index greater than a refractive index $n_{core}$ of the core is provided. An outer side surface of the high refractive index part 131 is within a boundary between the core and the cladding (within an outer surface of the taper fiber 13, in a case where an air cladding is employed as with the present embodiment). The high refractive index part 131 is surrounded by the core. A (relative) refractive index difference between the high refractive index part 131 and the core is smaller than that between the core and the cladding (air in the present embodiment). The exit end surface 12b of the GI fiber 12 is bonded to the entrance end surface 13a of the taper fiber 13 so that at least a part of the exit end surface 12b of the GI fiber 12 overlaps with a cross section of the high refractive index part 131 of the taper fiber 13. This allows at least a part of light which has exited the GI fiber 12 to enter the high refractive index part 131 of the taper fiber 13. The high refractive index part 131 refracts light, which has entered the high refractive index part 131, in a direction where an NA of the light becomes small. Consequently, a proportion of light, whose NA exceeds that of the output optical fiber 14, with respect to light which exits the taper fiber 13 is reduced, as compared with a case where no high refractive index part 131 exists. Note that an optical structure of the taper fiber 13 will be later discussed with reference to another drawing.

The output optical fiber 14 is configured to cause light, which has exited the taper fiber 13, to propagate. The output optical fiber 14 includes (i) a core 141 having a columnar shape, (ii) a cladding 142, having a cylindrical shape, which surrounds an outer side surface of the core 111 and has a refractive index higher than that of the core 141, and (iii) a jacket 143 surrounding an outer side surface of the cladding 142. A core diameter of the output optical fiber 14 is not limited to a specific one, provided that it is equal to or greater than the diameter, in the exit end surface 13b, of the taper fiber 13. In the present embodiment, the output optical fiber 14 has a core diameter equal to the diameter, in the exit end surface 13b, of the taper fiber 13. A cladding diameter of and a length of the output optical fiber 14 are not limited to respective specific ones.

Note that the present embodiment employs a configuration in which (i) a single input optical fiber 11 and (ii) six input optical fibers 11 surrounding the single input optical fiber 11 are provided. However, the present invention is not limited as such. That is, the number of and an arrangement of the plurality of input optical fibers 11 are not limited to respective specific ones. Similarly, the number of and an arrangement of the plurality of GI fibers 12 are also not limited to respective specific ones.

The present embodiment employs a configuration in which an NA of light, which enters the output optical fiber 14, is reduced by actions of the plurality of GI fibers 12 and the taper fiber 13. However, the present embodiment is not limited as such. Alternatively, the plurality of GI fibers 12 can be omitted, provided that an NA of light which enters the output optical fiber 14 can be sufficiently reduced by only the action of the taper fiber 13.

The present embodiment has discussed an example in which an optical fiber having a single cladding layer is employed as each of the input optical fiber 11 and the output optical fiber 14. The present invention is, however, not limited as such. Alternatively, an optical fiber, having two or more cladding layers, can be employed as each of the input optical fiber 11 and the output optical fiber 14. Furthermore, each of the input optical fiber 11 and the output optical fiber 14 is not necessarily a step-index (SI) optical fiber. Alternatively, a graded index (GI) optical fiber can be employed as each of the input optical fiber 11 and the output optical fiber 14.

The present embodiment employs a configuration in which the high refractive index part 131 penetrates the taper fiber 13 from the entrance end surface 13a to the exit end surface 13b. However, the present invention is not limited as such. Alternatively, the high refractive index part 131 can be provided (i) (partially or entirely) in the reduced diameter part 13B only or (ii) (partially or an entirely) in the non-reduced diameter part 13A only. Alternatively, the high refractive index part 131 can also be provided partially in the non-reduced diameter part 13A and the reduced diameter part 13B so as to bridge across a boundary between the non-reduced diameter part 13A and the reduced diameter part 13B.

[Optical Structure of Taper Fiber]

The following description will discuss an optical structure of a taper fiber 13 with reference to FIG. 2. An upper part of FIG. 2 is a sectional view illustrating a cross section (i.e., a cross section orthogonal to a central axis) of (a non-reduced diameter part 13A of) the taper fiber 13. A lower part of FIG. 2 is a graph indicating a refractive index distribution (i.e., a refractive index distribution on a straight line L orthogonal to the central axis) of the taper fiber 13.

The present embodiment employs, as a high refractive index part 131, a cylindrical part having an inner diameter and an outer diameter, each of which gradually decreases as a distance is farther from an entrance end surface 13a (note, however, that each of the inner diameter and the outer diameter is constant in the non-reduced diameter part 13A). As such, in a cross section of the taper fiber 13, the high refractive index part 131 has a toric region (see the upper part of FIG. 2).

The refractive index distribution of the taper fiber 13 is axially symmetric about the central axis of the taper fiber 13. As such, the refractive index distribution can be expressed by a function n(r) of a distance r from the central axis of the taper fiber 13. The refractive index distribution n(r) of the taper fiber 13 is expressed by the following equation. Note that the graph in the lower part of FIG. 2 is obtained in a case of α=2.

$$n(r)=n(R)\times[1-2\times\Delta\times\{(r-R)/a\}^{\alpha}]^{1/2}$$

where (R−a) and (R+a) respectively indicate an inner diameter and an outer diameter, in a target cross section, of the high refractive index part 131; and Δ indicates a relative refractive index difference defined by $(n_{peak}-n_{core})/n_{peak}$.

Note that, since n(r) reaches its maximum $n_{pear}$ when r=R, the relative refractive index difference Δ can also be expressed by $\Delta=(n(R)-n_{core})/n(R)$.

Dotted lines illustrated in the sectional view in the upper part of FIG. 2 indicate outer edges of exit end surfaces 12b of respective GI fibers 12. As illustrated in FIG. 2, the present embodiment employs a configuration in which the exit end surfaces 12b of the respective GI fibers 12 are bonded to the entrance end surface 13a of the taper fiber 13 so that centers of the exit end surfaces 12b of the respective GI fibers 12 overlap with the high refractive index part 131. More specifically, the present embodiment employs a configuration in which the exit end surfaces 12b of the respective GI fibers 12 are bonded to the entrance end surface 13a of the taper fiber 13 so that the centers of the exit end surfaces 12b of the respective GI fibers 12 overlap with parts (i.e., each circle with a radius R), of the high refractive index part 131, in which respective refractive indices peak. This causes a majority of light, which has exited the GI fibers 12, to enter the high refractive index part 131 of the taper fiber 13. Consequently, a proportion of light, whose NA exceeds an NA of an output optical fiber 14, with respect to light which exits the taper fiber 13 is further reduced as compared with a case where no high refractive index part 131 exists.

The refractive index distribution is defined by the relative refractive index difference Δ, a GI peak point R, a GI width 2a, and an index α. Preferable numerical ranges of the above respective parameters will be discussed below.

FIG. 3 is a graph indicating how a relative refractive index difference varies in accordance with an NA of light which exits the taper fiber 13. Note that the NA was calculated under the condition that the GI peak point R=125 μm, GI width 2a=135 μm, and the index α=2. The GI fiber 12 was bonded so that the center of the exit end surface 12b is located to be away, by 125 μm, from the central axis of the taper fiber 13.

FIG. 3 illustrates the following facts (1) and (2): (1) the NA is 0.049 in a case where no high refractive index part 131 exists, i.e., in a case where the relative refractive index difference Δ is 0%, 1 and (2) the NA is smaller than 0.049 in a case where the relative refractive index difference Δ satisfies 0%<Δ<0.076%.

The following conclusion will be drawn from the above facts. That is, in a case where the relative refractive index difference Δ satisfies 0%<Δ<0.076%, an NA of light which exits the taper fiber 13 can be reduced as compared with a case where no high refractive index part 131 exists.

FIG. 4 is a graph indicating how a GI peak point varies in accordance with an NA of light which exits the taper fiber 13. Note that the NA was calculated under the condition that the relative refractive index difference Δ=0.015%, the GI width 2a=135 μm, and the index α=2. The GI fiber 12 was bonded so that the center of the exit end surface 12b is located to be away, by 125 μm, from the central axis of the taper fiber 13.

FIG. 4 illustrates the following facts (1) and (2): (1) the NA bottoms out in a case where the GI peak point R matches a center of the GI fiber 12, i.e., in a case where the GI peak point R is 125 μm, and (2) the NA gradually increases in accordance with a decrease in GI peak point R, but the NA does not exceed 0.049 as long as at least a part of the exit end surface of the GI fiber 12 overlaps with the high refractive index part 131.

The following conclusion will be drawn from the above facts. That is, an NA of light which exits the taper fiber 13 can be reduced regardless of the GI peak point R, as compared with a case where no high refractive index part 131 exists, as long as at least a part of the exit end surface of the GI fiber 12 overlaps with the high refractive index part 131.

FIG. 5 is a graph indicating how a GI width varies in accordance an NA of light which exits the taper fiber 13. Note that the NA was calculated under the condition that the relative refractive index difference Δ=0.015%, the GI peak point R=125 μm, and the index α=2. The GI fiber 12 was bonded so that the center of the exit end surface 12b is located to be away, by 125 μm, from the central axis of the taper fiber 13.

FIG. 5 illustrates the following fact. In a case where the GI peak point R matches the center of the GI fiber 12, the NA barely changes regardless of the GI width 2a. The following conclusion will be drawn from this fact. That is, an NA of light which exits the taper fiber 13 can be reduced regardless of the GI width 2a, as compared with a case where no high refractive index part 131 exists, as long as the GI peak point R matches the center of the GI fiber 12.

FIG. 6 is a graph indicating how an index α varies in accordance with an NA of light which exits the taper fiber 13. Note that the NA was calculated under the condition that the relative refractive index difference Δ=0.015%, the GI peak point R=125 μm, and the GI width 2a=135 μm. The GI fiber 12 was bonded so that the center of the exit end surface 12b is located to be away, by 125 μm, from the central axis of the taper fiber 13.

FIG. 6 illustrates the following fact. At least in a case where α=1, 2, 3, 4, 5, or 10, the NA will never exceed 0.049. The following conclusion will be drawn from this fact. That is, an NA of light which exits the taper fiber 13 can be reduced regardless of a (which is a real number of not smaller than 1), as compared with a case where no high refractive index part 131 exists.

Note that in a case of α=1, the refractive index distribution n(r) of the taper fiber 13 is as indicated in FIG. 7A, whereas in a case of α=∞, the refractive index distribution n(r) of the taper fiber 13 is as indicated in FIG. 7B. In both of the above cases, an NA of light which exits the taper fiber 13 can be reduced as compared with a case where no high refractive index part 131 exists.

[Variation 1]

The following description will discuss a taper fiber 13 in accordance with Variation 1 with reference to FIG. 8. An upper part of FIG. 8 is a sectional view illustrating a cross section (i.e., a cross section orthogonal to a central axis) of (a non-reduced diameter part 13A of) the taper fiber 13 in accordance with Variation 1. A lower part of FIG. 8 is a graph indicating a refractive index distribution (i.e., a refractive index distribution on a straight line L orthogonal to the central axis) of the taper fiber 13 in accordance with Variation 1.

Variation 1 employs, as high refractive index parts 131, an aggregate of columnar parts each having an inner diameter and an outer diameter each of which gradually decreases as a distance is farther from an entrance end surface 13a (note, however, that each of the inner diameter and the outer diameter is constant in the non-reduced diameter part 13A). As such, in a cross section of the taper fiber 13, the high refractive index parts 131 are an aggregation of concentrically-arranged circular regions (see the upper part of FIG. 8).

A refractive index distribution of each of the high refractive index parts 131 is axially symmetric about a central axis of the each of the high refractive index parts 131. As such, the refractive index distribution ears be expressed as a function n(r') of a distance r' from the central axis of the each of the high refractive index parts 131. The refractive index distribution n(r') of the each of the high refractive index parts 131 is expressed by the following equation. Note that the graph in the lower part of FIG. 8 is obtained in a case of α=2.

$$n(r')=n(0)\times\{1-2\times\Delta\times(r'/a)^\alpha\}^{1/2}$$

where a is a diameter, in a target cross section, of the each of the high refractive index parts 131; and Δ is a relative refractive index difference defined by $(n_{peak}-n_{core})/n_{peak}$.

Note that since n(r') reaches its maximum $n_{pear}$ when r'=0, the relative refractive index difference Δ can also be expressed by $\Delta=(n(0)-n_{core})/n(0)$.

In the sectional view in the upper part of FIG. 8, outer edges of exit end surfaces 12b of respective GI fibers 12 (except for one provided at the center) match outer edges of corresponding high refractive index parts 131. That is, as illustrated in FIG. 8, Variation 1 employs a configuration in which the exit end surfaces 12b of the respective GI fibers 12 are bonded to the entrance end surface 13a of the taper fiber 13 so that centers of the exit end surfaces 12b of the respective GI fibers 12 overlap with corresponding high refractive index parts 131. More specifically, Variation 1 employs a configuration in which the exit end surfaces 12b of the respective GI fibers 12 are bonded to the entrance end surface 13a of the taper fiber 13 so that the centers of the exit end surfaces of the respective GI fibers 12 overlap with parts (i.e., each circle with a radius R), of the corresponding high refractive index parts 131, in which respective refractive indices peak. This causes a majority of light, which has exited the GI fibers 12, to enter the corresponding high refractive index parts 131 of the taper fiber 13. Consequently, a proportion of light, whose NA exceeds that of an output optical fiber 14, with respect to light which exits the taper fiber 13 is further reduced as compared with a case where no high refractive index part 131 exists.

[Variation 2]

The following description will discuss a taper fiber 13 in accordance with Variation 2 with reference to FIG. 9. An upper part of FIG. 9 is a sectional view illustrating a cross section (i.e., a cross section orthogonal to a central axis) of (a non-reduced diameter part 13A of) the taper fiber 13 in accordance with Variation 2. A lower part of FIG. 9 is a graph indicating a refractive index distribution (i.e., a refractive index distribution on a straight line L orthogonal to the central axis) of the taper fiber 13 in accordance with Variation 2.

Variation 2 employs, as high refractive index parts 131, double cylindrical parts each having an inner diameter and an outer diameter each of which gradually decreases as a distance is farther from an entrance end surface 13a (note, however, that each of the inner diameter and the outer diameter is constant in the non-reduced diameter part 13A). As such, in a cross section of the taper fiber 13, the high refractive index parts 131 are double toric regions (see the upper part of FIG. 9).

The refractive index distribution of the taper fiber 13 is axially symmetric about a central axis of the taper fiber 13. As such, refractive index distribution can be expressed by a function n(r) of distance r from the central axis of the taper fiber 13. The refractive index distribution n(r) of the taper fiber 13 is expressed by the following equation. Note that the graph in the lower part of FIG. 9 is obtained in a case of α=2.

$$n(r)=n(R1)\times[1-2\times\Delta\times\{(r-R1)/a\}^\alpha]^{1/2}+n(R2)\times[1-2\times\Delta\times\{(r-R2)/a\}^\alpha]^{1/2}$$

where (R1−a) and (R1+a) are respectively an inner diameter and an outer diameter, in a target cross section, of an inner high refractive index part 131a; (R2−a) and (R2+a) are respectively an inner diameter and an outer diameter, in a target cross section, of an outer high refractive index part 131b; and Δ is a relative refractive index difference defined by $(n_{peak}-n_{core})/n_{peak}$.

Note that, since n(r) reaches its maximum $n_{pear}$ when r=R1 and r=R2, the relative refractive index difference Δ can also be expressed by $\Delta=(n(R1)-n_{core})/n(R1)=(n(R2)-n_{core})/n(R2)$.

Dotted lines illustrated in the sectional view in the upper part of FIG. 9 indicates outer edges of exit end surfaces 12b of respective GI fibers 12. As illustrated in FIG. 9, Variation 2 employs a configuration in which the exit end surfaces 12b of the respective GI fibers 12 are bonded to the entrance end surface 13a of the taper fiber 13 so that centers of the exit end surfaces 12b of the respective GI fibers 12 overlap with corresponding high refractive index parts 131. More specifically, Variation 2 employs a configuration in which the exit end surfaces 12b of the respective GI fibers 12 are bonded to the entrance end surface 13a of the taper fiber 13 so that the centers of the exit end surfaces 12b of the respective GI fibers 12 overlap with parts (i.e., each circle with a radius R), of the corresponding high refractive index parts 131, in which respective refractive induces peak. This causes a majority of light, which has exited the GI fibers 12, to enter the corresponding high refractive index parts 131 of the taper fiber 13. Consequently, a proportion of light, whose NA exceeds that of an output optical fiber 14, with respect to light which exits the taper fiber 13 is further reduced as compared with a case where no high refractive index part 131 exists.

FIG. 9 illustrates an example configuration in which a single GI fiber 12 is surrounded by six GI fibers 12, which are further surrounded by twelve GI fibers 12. However, Variation 2 is not particularly limited as such. The number of GI fibers 12 which surround the single GI fiber 12 is not specific one, and the number of GI fibers 12 which further surrounds the GI fibers 12 surrounding the single GI fiber 12 is not specific one.

[Laser Device]

Lastly, the following description will discuss, with reference to FIG. 10, a laser device 100 which includes an optical coupler 1 in accordance with an embodiment of the present invention. FIG. 10 is a block diagram illustrating a configuration of the laser device 100.

As illustrated in FIG. 10, the laser device 100 includes a plurality of light sources 101, the optical coupler 1, and an end cap 102.

A light source 101 is configured to emit laser light. For example, a laser diode (LD) can be employed as the light source 101. Alternatively, a fiber laser which includes an LD and an amplifier fiber can be employed as the light source 101. An input optical fiber 11, which constitutes the optical coupler 1, is connected to a corresponding one of the plurality of light sources 101 so that laser light emitted from the corresponding one of the plurality of light sources 101 enters the input optical fibers 11.

The optical coupler 1 is configured to couple laser light emitted from the plurality of light sources 101. Since a configuration of the optical coupler 1 has been early discussed with reference to FIG. 1, explanations thereof are omitted. The end cap 102 is connected to an output optical fiber 14, which constitutes the optical coupler 1. With the configuration, a workpiece (irradiation target) is irradiated with light, which has exited the output optical fiber 14, via the end cap 102.

The end cap 102 is configured to present laser light reflected by the workpiece from reentering the output optical fiber 14.

According to the laser device 100, laser light which enters the output optical fiber 14 is high-power laser light whose output falls within a range of several W to several tens W. It should be noted that, according to the optical coupler 1, an NA of laser light which enters the output optical fiber 14 is reduced as compared with a conventional optical coupler. This causes a reduction in power of laser light which leaks out of the output optical fiber 14, as compared with a conventional optical coupler, and ultimately causes a problem(s), such as a deterioration in and/or burnout of the output optical fiber 14, to be less likely to occur.

[Main Points]

An optical coupler in accordance with an aspect of the present invention includes: a plurality of optical fibers; and a taper fiber having an entrance end surface to which an end surface of each of the plurality of optical fibers is bonded, the taper fiber having a core diameter which is smaller in an exit end surface than in the entrance end surface, the taper fiber having a high refractive index part provided inside a core of the taper fiber, the high refractive index part having a refractive index greater than a refractive index $n_{core}$ of the core, the end surface of the each of the plurality of optical fibers being bonded to the entrance end surface of the taper fiber so that at least a part of the end surface of the each of the plurality of optical fibers overlaps with a cross section of the high refractive index part of the taper fiber.

The above configuration allows at least a part of light which has exited the each of the plurality of optical fibers to enter the high refractive index part. The light which has entered the high refractive index part tends to remain in the high refractive index part. As such, the high refractive index part can prevent light, which has propagates in the reduced diameter part of the taper fiber, from being spread out. That is, the high refractive index part prevents an NA of light, which has entered the high refractive index part, from increasing. Consequently, an NA of at least a part of light which exits the taper fiber is reduced as compared with a case where no high refractive index part exists. This causes a proportion of light, whose NA exceeds that of the output optical fiber, with respect to light, which exits the taper fiber, to be reduced as compared with a case where a conventional optical coupler is employed.

An optical coupler in accordance with an aspect of the present invention is preferably configured such that the end surface of the each of the plurality of optical fibers is bonded to the entrance end surface of the taper fiber so that a center of the end surface of the each of the plurality of optical fibers overlaps with the cross section of the high refractive index part.

The above configuration allows a majority of light, which has exited the plurality of optical fibers, to enter the high refractive index part of the taper fiber. As discussed above, the high refractive index part prevents an NA of light which has entered the high refractive index part from increasing. Consequently, an NA of a majority of light, which exits the taper fiber, is reduced as compared with a case where no high refractive index part exists. This allows a proportion of light, whose NA exceeds that of the output optical fiber, with respect t light which exits the taper fiber to be further reduced.

An optical coupler in accordance with an aspect of the present invention is preferably configured such that a relative refractive index difference of the taper fiber satisfies NA(Δ)<NA(0), where Δ is the relative refractive index difference defined by $(n_{peak} - n_{core})/n_{peak}$; $n_{peak}$ is a maximum refractive index of the high refractive index part; NA(Δ) is an NA of light which propagates in the taper fiber; and the NA depends on the relative refractive index difference Δ of the taper fiber.

The above configuration makes it possible to surely cause an NA of light, which exits the taper fiber, to be reduced as compared with a case where no high refractive index part exists.

An optical coupler in accordance with an aspect of the present invention is preferably configured such that the relative refractive index difference Δ of the taper fiber is smaller than 0.076%.

The above configuration makes it possible to surely cause, an NA of light, which exits the taper fiber, to be reduced as compared with a case where no high refractive index part exists.

An optical coupler in accordance with an aspect of the present invention is preferably configured such that the high refractive index part is a cylindrical part, the cylindrical part having an inner diameter and an outer diameter each of which decreases as a distance is farther from the entrance end surface of the taper fiber.

The above configuration makes it possible to realize, in a case where the plurality of optical fibers are arranged in a toric manner, an easily-formable single part as the high refractive index part with which the end surfaces of the respective plurality of optical fibers overlap.

An optical coupler in accordance with an aspect of the present invention is preferably configured such that a refractive index distribution of the cylindrical part is axially symmetric about a central axis of the taper fiber, the refractive index distribution, in a cross section orthogonal to the central axis of the cylindrical part being expressed by $n(r)=n(R)\times[1-2\times\Delta\times\{(r-R)/a\}^{\alpha}]^{1/2}$, where $n(r)$ is the refractive index distribution; r is a distance from the central axis of the taper fiber; (R−a) and (R+a) are respectively an inner diameter and an outer diameter, in the cross section, of the cylindrical part; Δ is a relative refractive index difference defined by $(n(R)-n_{core})/n(R)$; and a is a given real number of not smaller than 1.

The above configuration makes it possible to surely cause an NA of light, which exits the taper fiber, to be reduced as compared with a case where no high refractive index part exists.

An optical coupler in accordance with an aspect of the present invention is preferably configured such that the high refractive index part is an aggregation of columnar parts each having a diameter which decreases as a distance is farther from the entrance end surface of the taper fiber.

The above configuration makes it possible to realize, in a case where the plurality of optical fibers are arranged in an toric manner, the high refractive index part, which overlaps with the end surfaces of the respective plurality of optical fibers, with a minimum volume.

An optical coupler in accordance with an aspect of the present invention is preferably configured such that a refractive index distribution of each of the columnar parts is axially symmetric about a central axis of the each of the columnar parts, and the refractive index distribution, in a cross section orthogonal to the central axis, of the each of the columnar parts is expressed by $n(r')=n(0)\times\{1-2\times\Delta\times(r'/a)^{\alpha}\}^{1/2}$, where $n(r')$ is the refractive index distribution; r' is a distance from the central axis of the each of the columnar parts; a is a diameter, in the cross section, of the each of the columnar parts; Δ is a relative refractive index difference defined by $(n(0)-n_{core})/n(0)$; and a is a given real number of not smaller than 1.

The above configuration makes it possible to surely cause an NA of light, which exits the taper fiber, to be reduced as compared with a case where no high refractive index part exists.

An optical coupler in accordance with an aspect of the present invention includes: a plurality of optical fibers; and a taper fiber having an entrance end surface to which an end surface of each of the plurality of optical fibers is bonded, the taper fiber having a core diameter which is smaller in an exit end surface than in the entrance end surface, the taper fiber having a high refractive index part provided inside a core of the taper fiber, the high refractive index part having a refractive index greater than a refractive index $n_{core}$ of the core, the end surface of the each of the plurality of optical fibers being bonded to the entrance end surface of the taper fiber so that at least a part of the end surface of the each of the plurality of optical fibers overlaps with a cross section of the high refractive index part of the taper fiber, a relative refractive index difference Δ of the taper fiber satisfying NA(Δ)<NA(0), where Δ is defined by $(n_{peak}-n_{core})/n_{peak}$ where $n_{peak}$ is a maximum refractive index of the high refractive index part; NA(Δ) is an NA of light which exits the taper fiber, the NA depending on the relative refractive index difference Δ and being defined by n×sin θ where n is a refraction index of a medium which the light enters and θ is an angle between a propagation direction of the light and a central axis of the taper fiber.

Note that (i) a laser device which includes the above optical coupler and (ii) a taper fiber which is included in the above optical coupler are also encompassed in the scope of the present invention.

[Supplemental Notes]

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is widely applicable to a laser device, such as a fiber laser, which needs to couple a plurality of laser light. Examples of a laser device, to which the present invention is suitably applicable, include industrial laser devices such as a processing laser device and a medical laser device.

REFERENCE SIGNS LIST

1 Optical coupler
11 Input optical fiber
111 Core
112 Cladding
11b Exit end surface
12 GI fiber (optical fiber)
12a Entrance end surface
12b Exit end surface
13 Taper fiber
131 High refractive index part
13a Entrance end surface
13b Exit end surface
13A Non-reduced diameter part
13B Reduced diameter part
14 Output optical fiber
141 Core
142 Cladding
143 Jacket
14a Entrance end surface
100 Laser device

The invention claimed is:

1. An optical coupler, comprising:
a plurality of optical fibers; and
a taper fiber having an entrance end surface to which an end surface of each of the plurality of optical fibers is bonded, the taper fiber having a core diameter which is smaller in an exit end surface than in the entrance end surface,
the taper fiber having a high refractive index part provided inside a core of the taper fiber, the high refractive index part having a refractive index greater than a refractive index $n_{core}$ of the core,
the end surface of the each of the plurality of optical fibers being bonded to the entrance end surface of the taper fiber so that at least a part of the end surface of the each of the plurality of optical fibers overlaps with a cross section of the high refractive index part of the taper fiber,
the taper fiber having a relative refractive index difference Δ which is smaller than 0.076%, the relative refractive index difference Δ being defined by $(n_{peak}-n_{core}/n_{peak}$, where $n_{peak}$ is a maximum refractive index of the high refractive index part.

2. The optical coupler as set forth in claim 1, wherein:
the end surface of the each of the plurality of optical fibers is bonded to the entrance end surface of the taper fiber so that a center of the end surface of the each of the plurality of optical fibers overlaps with the cross section of the high refractive index part.

3. The optical coupler as set forth in claim 1, wherein:
the high refractive index part is a cylindrical part, the cylindrical part having an inner diameter and an outer diameter each of which decreases as a distance is farther from the entrance end surface of the taper fiber.

4. The optical coupler as set forth in claim 3, wherein:
a refractive index distribution of the cylindrical part is axially symmetric about a central axis of the taper fiber,
the refractive index distribution, in a cross section orthogonal to the central axis, of the cylindrical part being expressed by $$n(r)=n(R)\times[1-2\times\Delta\times\{(r-R)/a\}^\alpha]^{1/2}$$

where n(r) is the refractive index distribution; r is a distance from the central axis of the taper fiber; $R^-$ and $R^+$ are respectively an inner diameter and an outer diameter, in the cross section, of the cylindrical part; $\Delta$ is a relative refractive index difference defined by $(n(R)-n_{core})/n(R)$; and $\alpha$ is a given real number of not smaller than 1, and wherein the following is satisfied:

$$R=(R^++R^-)/2, \text{ and}$$

$$a=(R^+-R^-)/2.$$

5. The optical coupler as set forth in claim 1, wherein:
the high refractive index part is an aggregation of columnar parts each having a diameter which decreases as a distance is farther from the entrance end surface of the taper fiber.

6. The optical coupler as set forth in claim 5, wherein:
a refractive index distribution of each of the columnar parts is axially symmetric about a central axis of the each of the columnar parts, and
the refractive index distribution, in a cross section orthogonal to the central axis, of the each of the columnar parts is expressed by $$n(r')=n(0)\times\{1-2\times\Delta\times(r'/a)^\alpha\}^{1/2}$$

where n(r') is the refractive index distribution; r' is a distance from the central axis of the each of the columnar parts; a is a diameter, in the cross section, of the each of the columnar parts; A is a relative refractive index difference defined by $(n(0)-n_{core})/n(0)$; n(0) is a value of n(r') when r'=0; and a is a given real number of not smaller than 1.

7. A laser device comprising the optical coupler as set forth in claim 1.

8. An optical coupler, comprising:
a plurality of optical fibers; and
a taper fiber having an entrance end surface to which an end surface of each of the plurality of optical fibers is bonded, the taper fiber having a core diameter which is smaller in an exit end surface than in the entrance end surface,
the taper fiber having a high refractive index part provided inside a core of the taper fiber, the high refractive index part having a refractive index greater than a refractive index $n_{core}$ of the core,
the end surface of the each of the plurality of optical fibers being bonded to the entrance end surface of the taper fiber so that at least a part of the end surface of the each of the plurality of optical fibers overlaps with a cross section of the high refractive index part of the taper fiber, a relative refractive index difference $\Delta$ of the taper fiber satisfying NA($\Delta$)<NA(0), where $\Delta$ is defined by $(n_{peak}-n_{core})/n_{peak}$ where $n_{peak}$ is a maximum refractive index of the high refractive index part; NA($\Delta$) is an NA of light which exits the taper fiber, the NA depending on the relative refractive index difference $\Delta$ and being defined by n×sin θ where n is a refraction index of a medium which the light enters and θ is an angle between a propagation direction of the light and a central axis of the taper fiber.

9. A laser device comprising the optical coupler as set forth in claim 8.

10. A taper fiber in which a core diameter in one end surface is smaller than a core diameter in the other end surface, the taper fiber comprising:
a high refractive index part, provided inside a core of the taper fiber, whose refractive index is greater than a refractive index $n_{core}$ of the core,
the taper fiber having a relative refractive index difference $\Delta$ which is smaller than 0.076%, the relative refractive index difference $\Delta$ being defined by $(n_{peak}-n_{core})/n_{peak}$, where $n_{peak}$ is a maximum refractive index of the high refractive index part.

11. A taper fiber in which a core diameter in one end surface is smaller than a core diameter in the other end surface, the taper fiber comprising:
a high refractive index part, provided inside a core of the taper fiber, whose refractive index is greater than a refractive index $n_{core}$ of the core,
a relative refractive index difference $\Delta$ of the taper fiber satisfying NA($\Delta$)<NA(0), where $\Delta$ is defined by $(n_{peak}-n_{core})/n_{peak}$ where $n_{peak}$ is a maximum refractive index of the high refractive index part; NA($\Delta$) is an NA of light which exits the taper fiber, the NA depending on the relative refractive index difference $\Delta$ and being defined by n×sin θ where n is a refraction index of a medium which the light enters and θ is an angle between a propagation direction of the light and a central axis of the taper fiber.

12. A taper fiber in which a core diameter in one end surface is smaller than a core diameter in the other end surface, the taper fiber comprising:
a high refractive index part, provided inside a core of the taper fiber, whose refractive index is greater than a refractive index $n_{core}$ of the core,
the high refractive index part having a refractive index distribution in which a refractive index becomes a maximum value inside the high refractive index part and the refractive index approaches the refractive index $n_{core}$ as a distance to a boundary of the core decreases, and
wherein the high refractive index part has a toric region on an entrance end surface of the high refractive index part.

13. The taper fiber as set forth in claim 12, wherein a refractive index of the high refractive index part that corresponds to the maximum value is greater than a refractive index of the taper fiber at a central axis of the taper fiber.

14. The taper fiber as set forth in claim 12, wherein the high refractive index part includes a cylindrical part in a reduced diameter part of the taper fiber, the cylindrical part having an inner diameter and an outer diameter each of which decreases as a distance is farther from an entrance end surface of the taper fiber.

15. The taper fiber as set forth in claim 12, wherein the high refractive index part includes a cylindrical part.

16. The taper fiber as set forth in claim 15, wherein a region surrounded by the cylindrical part includes a central axis of the taper fiber.

\* \* \* \* \*